United States Patent [19]

Corbett et al.

[11] 4,059,545

[45] Nov. 22, 1977

[54] CROSSLINKED STYRENE POLYMER FOAM HAVING SUPPRESSED IGNITION PROPERTIES

[75] Inventors: John M. Corbett; Richard E. Skochdopole, both of Midland; Anthony L. Scaggs, Sanford, all of Mich.

[73] Assignee: The Dow Chemical Company, Midland, Mich.

[21] Appl. No.: 643,452

[22] Filed: Dec. 22, 1975

[51] Int. Cl.$^2$ ............................ C08J 9/14; C08J 9/36
[52] U.S. Cl. ............................ 260/2.5 FP; 260/2.5 R; 260/45.7 R; 260/45.7 P; 260/47 UA; 526/15; 526/46; 526/49; 526/50; 526/54; 526/272
[58] Field of Search .................... 526/15; 260/2.5 FP

[56] References Cited

U.S. PATENT DOCUMENTS

| 3,039,977 | 6/1962 | Ingram | 260/2.5 |
| 3,245,933 | 4/1966 | Muskat | 260/29.6 |
| 3,267,070 | 8/1966 | Tousignant et al. | 260/45.85 |
| 3,328,367 | 6/1967 | Rees | 260/85.5 |

Primary Examiner—Stanford M. Levin
Attorney, Agent, or Firm—Michael S. Jenkins

[57] ABSTRACT

A monovinylidene aromatic polymer foam having reduced propensity to ignite is produced by (1) foaming a copolymer of monovinylidene aromatic monomer and an ethylenically unsaturated carboxylic anhydride wherein a portion of the copolymer contains halogen moiety and (2) subsequently crosslinking the copolymer foam by contacting it with a crosslinking agent such as alkylene polyamine. The resultant copolymer foam does not melt or drip upon exposure to flame.

12 Claims, No Drawings

CROSSLINKED STYRENE POLYMER FOAM HAVING SUPPRESSED IGNITION PROPERTIES

BACKGROUND OF THE INVENTION

This invention relates to foamed alkenyl aromatic polymers.

The use of styrene polymers in the production of foamed articles is well recognized. Particularly well known is the use of such foamed polymers in building and construction industries for insulative and decorative purposes. Unfortunately, however, such polymers burn readily and continuously upon exposure to flame.

It has been a widespread practice to reduce the propensity of such polymers to ignite by incorporating into them various phosphorus, nitrogen and halogen containing additives. A disadvantage in using such additives has been the detrimental effect such additives have on the physical properties of the foamed styrene polymers. Also, upon exposure to flame, such polymers having reduced ignition propensity melt or drip. This melt often ignites as readily as polymer containing no additive. As a result, a puddle of burning polymer is formed that evolves great quantities of black smoke.

In view of the aforementioned deficiencies of conventional styrene polymer foams, it is highly desirable to provide a styrene polymer foam which has a reduced propensity to propagate combustion and does not melt upon exposure to flame.

SUMMARY OF THE INVENTION

The present invention is a non-melting styrene polymer foam comprising a crosslinked copolymer of a monovinylidene aromatic monomer and an ethylenically unsaturated carboxylic anhydride, said copolymer containing as an integral part thereof a halogenated moiety in an amount sufficient to reduce the propensity of the foam to propagate combustion after the removal of a small scale ignition source such as a Bunsen burner. The copolymer is sufficiently crosslinked to prevent the foam from melting and dripping upon exposure to flame. Surprisingly, the presence of the halogen moiety as an integral part of the anhydride copolymer imparts reduced flame propagation characteristics without adversely affecting the physical properties of the copolymer. On the other hand, the concentration of the halogen moiety as a non-integral part of the copolymer, i.e., as an additive in an amount required to provide the desired reduced burning characteristics, does adversely affect the physical characteristics of the copolymer.

Foam articles of the present invention are useful as construction materials, furniture, and the like. For the purposes of this invention, a halogenated moiety shall contain chlorine and/or bromine, preferably bromine, and shall be considered an integral part of the polymer only if it is chemically bonded to the copolymer.

DETAILED DESCRIPTION OF THE EMBODIMENT

Monovinylidene aromatic/ethylenically unsaturated anhydride copolymers, hereinafter called anhydride copolymers, employed in the practice of this invention are normally solid, thermoplastic copolymers of from about 40 to about 90, preferably from about 45 to about 88, weight percent of a monovinylidene aromatic monomer and from about 10 to about 50, preferably from about 12 to about 32, weight percent of an α,β-ethylenically unsaturated carboxylic anhydride. It is understood that such copolymers are thermoplastic prior to, but not after, crosslinking to the degree required herein.

By monovinylidene aromatic monomers is meant that to an aromatic ring in each molecule of monomer is attached one radical of the formula:

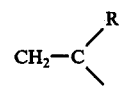

wherein R is hydrogen or lower alkyl having from 1 to 4 carbon atoms such as methyl, ethyl, propyl and butyl.

Exemplary monovinylidene aromatic monomers are styrene, α-methylstyrene, ar-(t-butyl)styrene, ar-chlorostyrene, ar-bromostyrene ar,ar-dibromostyrene, and the like, preferably styrene or ar-bromostyrene.

Exemplary α,β-ethylenically unsaturated anhydrides include maleic anhydride, phenylmaleic anhydride citraconic anhydride, itaconic anhydride, chloromaleic anhydride, bromomaleic anhydride, and the like, preferably maleic anhydride.

In addition to the foregoing monomers, there may be employed halogen-containing monomers that are copolymerizable with one or more of the aforementioned monomers such as the halohydrocarbyl esters of α,β-ethylenically unsaturated carboxylic acids, e.g. tris(bromomethyl) ethyl methacrylate, 2,3-dibromopropyl methacrylate, 2,3,3-tribromoallyl maleate, tribromophenoxyethyl methacrylate, bis(tribromoneopentyl) maleate, bis(tribromophenoxy)fumarate, tribromophenyl methacrylate, other halohydrocarbyl esters wherein hydrocarbyl is alkyl, aryl, aralkyl, cycloalkyl and similar monovalent hydrocarbon radicals; vinyl and vinylidene halides, e.g., vinyl chloride, vinyl bromide and vinylidene chloride; and other halogenated ethylenically unsaturated monomers, e.g., N-(tribromoneopentoxymethyl)acrylamide.

Other optional monomers suitably copolymerized with the aforementioned monomers include α,β-ethylenically unsaturated nitriles such as acrylonitrile and methacrylonitrile; alkyl esters of α,β-ethylenically unsaturated carboxylic acids, e.g., ethyl acrylate, butyl acrylate and methyl methacrylate; vinyl esters, e.g., vinyl acetate; α-olefins, e.g., ethylene, propylene and butene-1; conjugated dienes, e.g., butadiene and isoprene and the like.

Of the copolymers within the scope of this invention, those wherein the halogenated moiety is supplied by a halohydrocarbyl ester are preferred.

In any case, sufficient halogen is employed to reduce the flame propagation characteristics of the polymer. In most suitable embodiments, the amount of halogen is within the range from about 15 to about 45 weight percent based on the polymer weight, preferably from about 18 to about 30 weight percent.

The anhydride copolymers employed in the present invention are readily prepared by the methods described in U.S. Pat. No. 2,971,939 to Baer and in the article by A. W. Hanson and R. L. Zimmerman, I. & E. C., 49, 1803 (1957).

In addition to copolymerizing one of the foregoing halogen-containing monomers, it is understood that the halogen moiety may be made an integral part of the copolymer by reacting the copolymer, e.g., a styrene/maleic anhydride copolymer, with a halogen containing reactant, e.g., a bromoalcohol such as 2,3,3-tribromoallyl alcohol, 2,3-dibromopropanol, tribromoneopentyl alcohol, pentabromophenol, tribromophenol, 3,4-dibromocyclohexane-1-methanol and tribromophenoxyethanol. In such a case, only a portion of the anhydride is esterified in order that sufficient anhydride remain available for crosslinking. Esterification is most advantageously effected in the presence of a conventional esterification catalyst including acids such as p-toluene sulfonic acid, sulfuric acid, cation exchange resin beads in the hydrogen (or acid) form and bases such as sodium hydroxide, triethyl amine and pyridine.

Following the preparation of the anhydride copolymer, the copolymer is fabricated into the desired article by conventional fabricating means such as extrusion, molding and the like. Of particular interest is the manufacture of foamed articles by extrusion of a composition comprising the anhydride copolymer containing a blowing agent such as methyl chloride, ethyl chloride, vinyl chloride, trichlorofluoromethane, dichlorodifluoromethane and dichlorotetrafluoroethane. This preferred fabrication process is described in more detail in U.S. Pat. No. 2,669,751 to McCurdy and DeLong.

In accordance with this invention, the anhydride copolymer, after fabrication, is preferably crosslinked by contacting the fabricated article of the anhydride copolymer with a polyfunctional compound such as a polyamine which is capable of reacting with the dicarboxylic acid anhydride groups, thereby crosslinking the polymer molecules. In addition to the polyamines, the anhydride groups of the copolymer also are reactive with polyhydric compounds and hydroxy amines; therefore, suitable crosslinking agents may be selected from any of these polyfunctional compounds.

In order to provide sufficient crosslinking to form a non-melting copolymer article, the copolymer should contain at least 1, preferably at least 1.25, milliequivalents of anhydride moiety per gram of copolymer.

Among the polyamines which may be used are the aliphatic polyamines such as ethylene diamine, diethylene triamine, triethylenetetraamine, 1,4-cyclohexane-bis(methylamine) and N,N'-diethylaminopropylamine. The cyclic amines such as piperazine may be used. Suitable aromatic amines are meta-phenylene diamine; diaminomethyldiphenyloxide; 4,4'-p,p'-oxydianiline; metaphenylenediamine; 4,4'-methylene bis(2,6-dibromoaniline); and 4,4'-methylene dianiline. Of the polyamines, those containing two or more primary amine groups are especially preferred.

Suitable polyhydric compounds, also known as polyols, are the common glycols such as ethylene glycol, propylene glycol, polyethylene glycol, polypropylene glycol, 1,4-butanediol and polyhydric compounds such as glycerol. Also compounds having mixed functionality may be employed as suitable crosslinking agents such as the alkanolamines, e.g., ethanolamine, diethanolamine, triethanolamine, and the like.

Several procedures may be employed to contact the fabricated article with the polyfunctional compound. The polyfunctional compound may be applied as a coating by spraying or brushing to the surfaces of the fabricated article. The article may be immersed in the polyfunctional compound for a time sufficient to produce the desired crosslinking provided that the anhydride copolymer is neither soluble in the polyfunctional compound nor noticeably softened by it. In the alternative, the article may be dipped in the dipping liquid and then held at a desirable treating temperature so that the film of agent coating the article can diffuse into the surface layer. When the dip method is being used to treat the surfaces of the fabricated article, the article may be dipped into the treating agent periodically to replenish the film of crosslinking agent which has permeated the surfaces and becomes crosslinked with the polymer. In this manner, a film is maintained on the surfaces without sufficient unreacted material being present to soften the article sufficiently to result in distortion.

Some of the polyfunctional crosslinking agents, and particularly polyamines, have sufficient solvency for the anhydride copolymers that neither of the above methods for treating the article can be used without danger of distortion. In those cases, a third method may be employed wherein the fabricated article is exposed to vapors of the crosslinking agent. These vapors may be diluted with air, nitrogen, or other inert gas to obtain a low partial pressure or vapor concentration at the temperature and pressure employed in treating the article.

The temperature at which the crosslinking reaction is conducted is selected to provide the best rate of reaction without softening or deforming the fabricated article. Temperatures are suitably in the range from about 0° to about 200° C, preferably in the range from about 23° to about 150° C. Temperatures below 0° C are more expensive to maintain and produce low reaction rates. In addition to the danger of heat distortion when crosslinking at high temperature, the reaction may be so rapid that crosslinking occurs before the polyfunctional compound has permeated the copolymer to a substantial depth, thereby forming a highly crosslinked surface which impedes further permeation of the crosslinking agents.

Fabricated articles which may be treated in accordance with this invention include extruded shapes, filaments, sheets, molded objects and foamed bodies. Thin sections such as films and foams require great care in the treating step to avoid deformation. However, the treated article has a much higher percentage of the crosslinked copolymer than usually is obtained with thicker sections wherein the crosslinking agent cannot diffuse as thoroughly into the copolymer within a reasonable length of time.

The following examples are given to illustrate the invention and should not be construed as limiting its scope. All parts and percentages are by weight unless otherwise indicated.

The tests employed in the following examples to demonstrate reduced flame propagation properties of the copolymer all accurately demonstrate the burning characteristics of the copolymer when exposed to small scale ignition sources according to the test employed. It is well recognized by those skilled in this art and should be clearly understood by others, however, that all known organic polymers will burn when subjected to a sufficiently intense heat source (whether or not they contain a fire retardant additive).

EXAMPLE 1

A 100-part portion of a styrene/maleic anhydride (72/28) copolymer prepared in a conventional manner (U.S. Pat. No. 2,971,939) is dissolved in benzene and partially esterified by adding 62 parts of 2,2,2-tris(bromomethyl)ethanol and 0.2 parts of p-toluene sulfonic acid at 80° C. Approximately 50 percent of the available anhydride groups are esterified in this manner. The resulting partially esterified anhydride copolymer is recovered by distilling the benzene solvent. The recovered copolymer is blended with methyl chloride and explosively foamed by heating the blended material in sealed ampoule overnight followed by breaking of the ampoule. Alternatively, the copolymer is foamed by first dissolving 10 parts of the partially esterified copolymer in 50 parts of methyl chloride containing about 25 parts of methyl ethyl ketone. The solution is stirred to remove excess solvent and then placed under vacuum of about 50 mm Hg at 60° C to foam the copolymer. The resultant foams which are white and have a fine cell structure are then exposed to ethylenediamine vapors for fifteen hours at equilibrium vapor pressure and 23° C. Neither of the crosslinked copolymer foams will support combustion after being placed in the flame of a Bunsen burner for a period of time sufficient to ignite the foam and then removed. Neither foam will melt or drip while being exposed to the flame.

For the purposes of comparison, the styrene/maleic anhydride (72/28) copolymer containing no halogen moiety is explosively foamed using methyl chloride as a blowing agent. The anhydride copolymer foam is crosslinked by the procedure employed in the preceding example. Upon exposure of the crosslinked anhydride copolymer foam to the flame of the Bunsen burner, the foam burns vigorously and continues to do so after the foam is removed from the flame. Accordingly, it is shown that crosslinking the polymer does not produce a foam having reduced flame propagation tendencies. In fact, upon exposure of a foam of the non-crosslinked styrene/maleic anhydride copolymer to flame, it is observed that the crosslinked copolymer foam ignites and burns more readily and more rapidly than the non-crosslinked copolymer foam.

Also for comparison purposes, several solutions are made by dissolving 10 parts of the styrene/maleic anhydride copolymer containing no halogen moiety in 50 parts of methyl chloride containing about 25 parts of methyl ethyl ketone. One of the following conventional flame retardant additives is added to each solution at concentration of 33 parts per hundred parts of the copolymer:

hexabromocyclodecane
tris(2,3-dibromopropyl)phosphate
pentabromomonochlorocyclohexane
1,2,3,4-tetrabromobutane
hexabromobenzene
decabromodiphenyl oxide
tris(tribromoneopentyl)phosphate
ethylene bis[tris (cyanoethyl)phosphonium bromide]
trans-bis(3-cyclohexenyl)ethylene hexabromide.

The resulting solutions are stirred to remove excess solvent and then placed under vacuum of about 50 mm Hg at 60° C to yield the desired foams. Portions of the anhydride copolymer foams are then crosslinked with ethylene diamine vapors and placed in the flame of a Bunsen burner as in the preceding example. Even upon removal of the flame, all of the crosslinked foams continued to burn for at least 10 seconds but generally did not drip at any time. The remaining portions of non-crosslinked anhydride copolymer foams drip upon exposure to the flame, but do not burn after the flame is removed.

EXAMPLE 2

A 10-part portion of an ar-bromostyrene/maleic anhydride (64.5/35.5) copolymer prepared by conventional thermal polymerization is mixed with 10 parts of methyl chloride. The mixture is enclosed in an ampoule and explosively foamed by heating at 190° C for 2 hours and then cooled at 170° C before breaking the ampoule. The resultant foam which is white and has a fine cell structure is exposed to ethylene diamine vapors overnight. After the ethylene diamine is removed, the crosslinked foam is placed in the flame of a Bunsen burner until the foam ignites. The foam does not drip and extinguishes immediately upon removal from the flame.

EXAMPLE 3

Following the procedure of Example 1, a styrene/2,4,6-tribromophenoxyethylmethacrylate (TBPEM)/maleic anhydride (51.8/33.2/15) terpolymer and a styrene/TBPEM/maleic anhydride (48/37/15) terpolymer are prepared by polymerizing the corresponding monomers in the presence of a free radical peroxide catalyst. The resulting copolymer samples are then foamed, crosslinked and tested for burning characteristics generally according to the procedures of Example 1. The results of the tests are recorded in Table I.

TABLE I

| Sample No. | % Br. Wt. % | Extinction Time (1) sec. |
| --- | --- | --- |
| 1 | 18 | <5 with no dripping |
| 2 | 20 | <5 with no dripping |

(1) Time is seconds for copolymer sample to extinguish upon removal of the flame of the bunsen burner.

What is claimed is:

1. A non-melting copolymer foam of a monovinylidene aromatic monomer and an ethylenically unsaturated carboxylic anhydride, said copolymer having chemically bonded thereto an amount of a halogenated moiety containing chlorine and/or bromine sufficient to reduce the propensity of the copolymer to propagate combustion, said copolymer containing at least 1 milliequivalent of anhydride moiety per gram of copolymer, and said copolymer being crosslinked with a polyfunctional compound through the anhydride moiety to a degree sufficient to render it non-melting upon exposure to flame.

2. The copolymer foam of claim 1 wherein crosslinking is effected by contacting the copolymer with a gaseous polyamine containing at least 2 primary amino groups.

3. The copolymer foam of claim 2 which is a copolymer of styrene and maleic anhydride wherein the anhydride is partially esterified with alcohol containing chlorine and/or bromine to provide said halogenated moiety.

4. The copolymer foam of claim 3 wherein the alcohol is a brominated aliphatic alcohol.

5. The copolymer foam of claim 4 wherein the brominated aliphatic alcohol is 2,2,2-tris(bromomethyl)ethanol.

6. The copolymer foam of claim 3 wherein the alcohol is a brominated aromatic alcohol.

7. The copolymer foam of claim 6 wherein the brominated aromatic alcohol is tribromophenoxyethanol.

8. The copolymer foam of claim 2 wherein the polyamine is ethylenediamine.

9. The copolymer foam of claim 1 wherein the monovinylidene aromatic monomer is ar-bromostyrene.

10. The copolymer foam of claim 1 wherein the copolymer contains (1) from about 15 to about 45 weight percent bromine and (2) at least about 1 milliequivalent of anhydride moiety per gram of copolymer.

11. The copolymer foam of claim 2 wherein the copolymer is a copolymer containing from about 40 to about 90 weight percent of copolymerized monovinylidene aromatic monomer and from about 10 to about 50 weight percent of copolymerized α,β-ethylenically unsaturated carboxylic anhydride.

12. The copolymer foam of claim 11 wherein the copolymer contains from about 45 to about 88 weight percent of copolymerized styrene and from about 12 to about 32 weight percent of copolymerized maleic anhydride.

* * * * *

UNITED STATES PATENT AND TRADEMARK OFFICE
CERTIFICATE OF CORRECTION

PATENT NO. : 4,059,545

DATED : November 22, 1977

INVENTOR(S) : John M. Corbett; Richard E. Skochdopole; Anthony L. Scaggs

It is certified that error appears in the above-identified patent and that said Letters Patent are hereby corrected as shown below:

Column 2, line 9, the formula should read: $CH_2=C\diagup^R_{\diagdown}$

Column 6, line 49, after "with" insert --an--.

Signed and Sealed this

Eighteenth Day of April 1978

[SEAL]

Attest:

RUTH C. MASON
Attesting Officer

LUTRELLE F. PARKER
Acting Commissioner of Patents and Trademarks